A. K. & C. A. ALLEN.
RUBBER TIRE.
APPLICATION FILED JAN. 28, 1916.
1,193,108.
Patented Aug. 1, 1916.
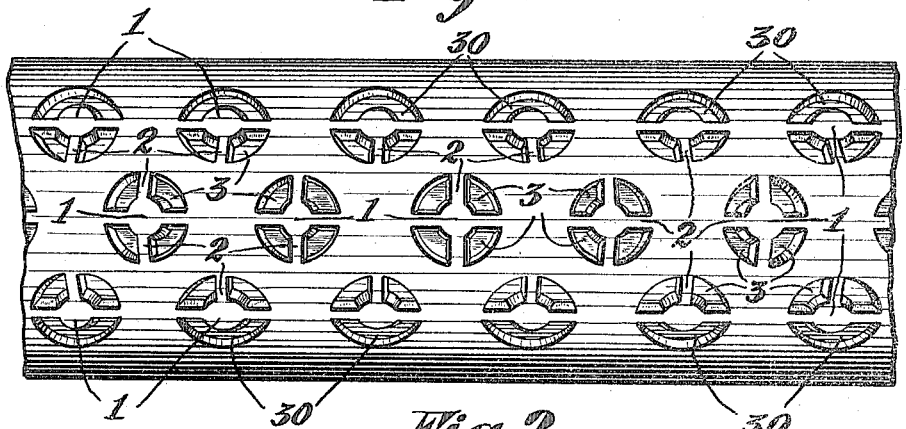
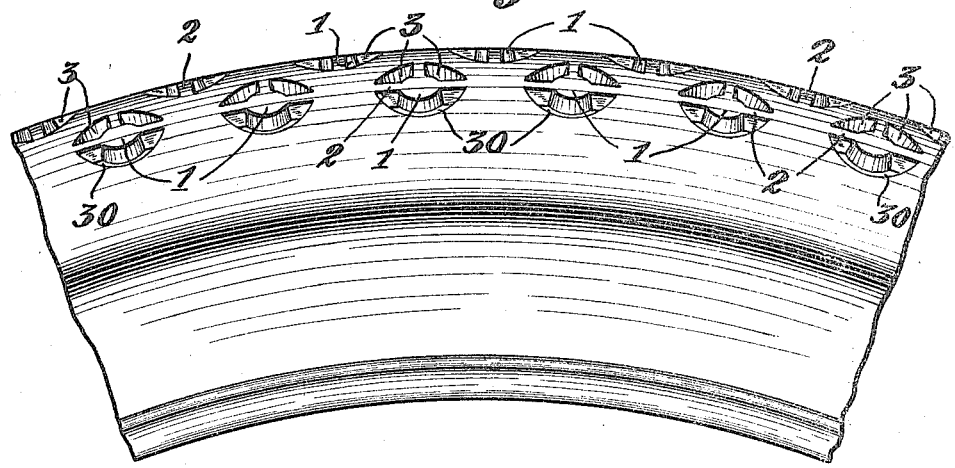
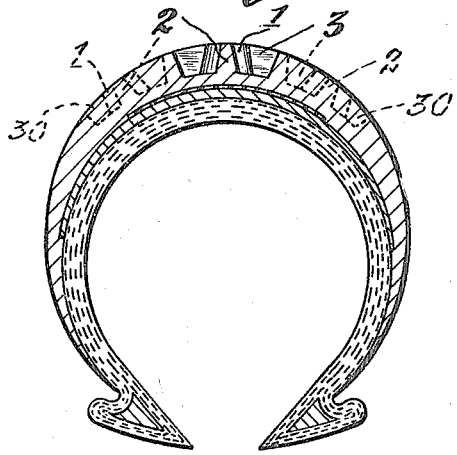
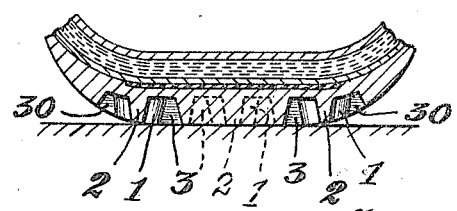
Inventors
Archibald K. Allen.
Clarence A. Allen.
By Reynolds & Sproll
Attorneys.

UNITED STATES PATENT OFFICE.

ARCHIBALD K. ALLEN AND CLARENCE A. ALLEN, OF SEATTLE, WASHINGTON.

RUBBER TIRE.

1,193,108.  Specification of Letters Patent.  Patented Aug. 1, 1916.

Application filed January 28, 1916. Serial No. 74,894.

*To all whom it may concern:*

Be it known that we, ARCHIBALD K. ALLEN and CLARENCE A. ALLEN, citizens of the United States, and residents of the city of Seattle, county of King, State of Washington, have invented certain new and useful Improvements in Rubber Tires, of which the following is a specification.

Our invention relates to an improvement in rubber-tires, and comprises certain novel features of construction which will be hereinafter described and then defined in the claim.

The object of our invention is to produce a tire of the sort which is known as "non-skid", that is a tire which will have greater holding and gripping properties upon a pavement than a smooth surface tire.

In the accompanying drawings we have shown our tire in the construction which is now preferred by us.

Figure 1 is a face view of the tread of a short section of tire. Fig. 2 is a side view of a section of the same tire. Fig. 3 is a cross-section of the tire, and Fig. 4 is a cross-section of the tread part of the tire, showing the position which it assumes under ordinary loading.

In accordance with this invention, the tire is provided with recesses extending in three rows about the tire, one on the center line of the tread and one at each side. The central row is composed of groups, each group consisting of four arcuate recesses having a common center, each recess being sufficiently less than a quadrant to provide substantial ribs or buttresses 2, connecting the central plug 1 with the outer walls. These ribs, or supporting buttresses 2 are preferably placed so that one pair extend lengthwise of the tread and the other pair at right angles thereto. The pair which extend lengthwise of the tread, support the central plug against driving strains, while the transverse buttresses support the plug against side strains. The plug is therefore well supported against strains in all directions, and will not pull out as would the plug of the design patent when subjected to heavy side strains.

We have also provided the tire with a row of recesses at each side of the central row, these recesses being of the same character as those of the central row, excepting that one of the buttresses 2 is omitted; this omission being at the outer side of the row, thus forming a recess 30 which is approximately twice as long as the others. The transverse rib 2 at the inner side of these rows is retained. This makes the outer rows consist of an outer arcuate recess of approximately half a circle and two inner recesses, which approximate to a quarter of a circle. While the ribs or buttresses 2 may be retained at the outer side of these outer rows, we have found that the strain is seldom of such character as would require their presence, and for that reason have omitted them.

In Fig. 4 the condition existing when the tire is loaded is shown. The tread of the tire has been compressed so as to present a flattened cross-section, which extends to substantially the center webs of the outer rows. We have found that this type of recess is much superior to others which have been used.

The central plugs are so supported that they will not pull out, and we have found that the grip of the tire upon the pavement is somewhat increased. We have also found that the noise made by the tire when rapidly rolling over the pavement has been somewhat reduced.

In making the tire we prefer to group the recesses of the different rows in such manner that the groups in each row is in staggered relation with the groups of adjacent rows, as is clearly shown in the drawings.

What we claim as our invention is:

A rubber tire having recesses arranged in groups extending in a row along the central line of the tread, each group consisting of four arcuate recesses having a common center and forming a central plug and four buttress webs extending from the plug to the outer wall, and a row of groups of arcuate recesses at each side the central row, each group consisting of two like arcuate recesses forming the half of the group which is next the central row and a single arcuate recess forming the outer half of the group, said recesses of each group also having a common center.

Signed at Seattle, Washington, this 21st day of January, 1916.

ARCHIBALD K. ALLEN.
CLARENCE A. ALLEN.